(12) United States Patent
Siomina et al.

(10) Patent No.: US 10,206,210 B2
(45) Date of Patent: Feb. 12, 2019

(54) USE OF BLANK SUBFRAMES FOR D2D

(71) Applicant: Telefonaktiebolaget L M Ericsson (publ), Stockholm (SE)

(72) Inventors: Iana Siomina, Täby (SE); Muhammad Kazmi, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 68 days.

(21) Appl. No.: 14/778,544

(22) PCT Filed: Aug. 5, 2015

(86) PCT No.: PCT/SE2015/050849
§ 371 (c)(1),
(2) Date: Sep. 18, 2015

(87) PCT Pub. No.: WO2016/022061
PCT Pub. Date: Feb. 11, 2016

(65) Prior Publication Data
US 2016/0295582 A1    Oct. 6, 2016

Related U.S. Application Data

(60) Provisional application No. 62/034,635, filed on Aug. 7, 2014.

(51) Int. Cl.
*H04H 20/71* (2008.01)
*H04W 72/04* (2009.01)
(Continued)

(52) U.S. Cl.
CPC ......... *H04W 72/0446* (2013.01); *H04W 4/06* (2013.01); *H04W 72/04* (2013.01);
(Continued)

(58) Field of Classification Search
CPC ... H04W 72/0446; H04W 4/06; H04W 72/04; H04W 92/18
(Continued)

(56) References Cited

U.S. PATENT DOCUMENTS

2013/0215814 A1    8/2013  Lee et al.
2013/0322277 A1*  12/2013  Vanganuru ............ H04W 24/08
                                                         370/252
(Continued)

FOREIGN PATENT DOCUMENTS

EP     2717482 A1    4/2014
WO  2010082114 A1    7/2010
WO  2016022060 A1    2/2016

OTHER PUBLICATIONS

Interdigital, "D2D Discovery in LTE", 3GPP TSG-RAN WG1 Meeting #73, Fukuoka, Japan, May 20, 2013, pp. 1-6, R1-132187, 3GPP.

(Continued)

*Primary Examiner* — Sai Ming Chan
(74) *Attorney, Agent, or Firm* — Coats & Bennett, PLLC

(57) ABSTRACT

There is disclosed a method performed by a first D2D enabled node (100), comprising the steps of obtaining a configuration indicative of one or more blank subframes in a first cell and/or on a first carrier frequency, wherein the one or more blank subframes comprise DL and/or UL subframes and the configuration of the one or more blank subframes is indicative of that the first D2D enabled node (100) is not and will not be scheduled in DL and/or UL during the one or more blank subframes. The method also comprises performing a D2D operation in at least one of the one or more blank subframes.
There are also disclosed related devices like a D2D enabled node and a network node as well as related methods.

33 Claims, 8 Drawing Sheets

(51) Int. Cl.
*H04W 4/06* (2009.01)
*H04W 76/14* (2018.01)
*H04W 8/00* (2009.01)
*H04W 92/18* (2009.01)
*H04L 12/18* (2006.01)

(52) U.S. Cl.
CPC .......... *H04L 12/189* (2013.01); *H04W 8/005* (2013.01); *H04W 76/14* (2018.02); *H04W 92/18* (2013.01)

(58) Field of Classification Search
USPC .......................................................... 370/312
See application file for complete search history.

(56) References Cited

U.S. PATENT DOCUMENTS

| | | | | |
|---|---|---|---|---|
| 2014/0003301 | A1* | 1/2014 | Madan | H04W 72/042 370/280 |
| 2014/0126432 | A1 | 5/2014 | Wang et al. | |
| 2015/0043544 | A1* | 2/2015 | Seo | H04B 7/2656 370/336 |
| 2015/0257184 | A1* | 9/2015 | Yamazaki | H04W 76/023 370/329 |
| 2016/0309502 | A1* | 10/2016 | Seo | H04W 72/1278 |

OTHER PUBLICATIONS

Kyocera, "Inter-frequency discovery considerations", 3GPP TSG-RAN WG2 #86, Seoul, Republic of Korea, May 19, 2014, pp. 1-10, R2-142240, 3GPP.

Interdigital Communications, "Coexistence between cellular and D2D Communications", 3GPP TSG-RAN WG2#86, Seoul, Korea, May 19, 2014, pp. 1-3, Tdoc R2-142691, 3GPP.

NEC, "D2D and cellular resource multiplexing configuration", 3GPP TSG RAN WG1 Meeting #77, Seoul, Korea, May 19, 2014, pp. 1-3, R1-142173, 3GPP.

NTT Docomo, Inc., "Discussion on Inter-cell and Inter-carrier D2D", TSG RAN WG1 Meeting #77, Soul, Korea, May 19, 2014, pp. 1-6, R1-142270, 3GPP.

* cited by examiner

USE OF BLANK SUBFRAMES FOR D2D

TECHNICAL FIELD

The present disclosure pertains to D2D operation of devices in or for a wireless communication network, in particular to the use of blank subframes in the context of D2D operation.

BACKGROUND

If D2D enabled nodes or UEs are in proximity to each other, they may be able to use a "direct mode" (e.g., as in FIG. 1) or "locally-routed" (e.g., as in FIG. 2) path for data communication, unlike in the conventional cellular communication (FIG. 3). In such so-called device-to-device communication, the source and the target are wireless devices or D2D enabled nodes, e.g., UEs. Some of the potential advantages are off-loading of the cellular network, faster communication, increased awareness of surrounding wireless devices of interest (e.g., running the same application), higher-quality links due to a shorter distance, etc. Some appealing applications of D2D communications are video streaming, online gaming, media downloading, peer-to-peer (P2P), file sharing, etc.

A more detailed example reference architecture for D2D operation is illustrated in FIG. 4.

A D2D enabled node of a wireless communication network like, e.g., a UE, may not be able to receive cellular signals and D2D signals simultaneously and may miss one or both types of signals if they are received by the D2D enabled node or UE during the same or overlapping time period. The network node serving the D2D enabled node or UE may not even be aware of such loss of signals and may cause excessive delay in delivering data to the UE.

SUMMARY

One aim of this disclosure may be to facilitate that a D2D enabled node or UE is able to perform both D2D and cellular operations and/or to enable a network node to sense or configure the D2D enabled node or UE behavior with respect to the type(s) of operation the D2D enabled node or UE is to perform, in particular regarding improved use of available resources.

There is disclosed a method performed by a first D2D enabled node. The method comprises obtaining a configuration indicative of one or more blank subframes in a first cell and/or on a first carrier frequency, wherein the one or more blank subframes comprise DL and/or UL subframes and the configuration of the one or more blank subframes is indicative of that the first D2D enabled node is not and will not be scheduled in DL and/or UL during the one or more blank subframes. The method further comprises performing a D2D operation in at least one of the one or more blank subframes.

Moreover, there is disclosed a D2D enabled node, the D2D enabled node being adapted for obtaining a configuration indicative of one or more blank subframes in a first cell and/or on a first carrier frequency, wherein the one or more blank subframes comprise DL and/or UL subframes and the configuration of the one or more blank subframes is indicative of that the D2D enabled node is not and will not be scheduled in DL and/or UL during the one or more blank subframes. The D2D enabled node further is adapted for performing a D2D operation in at least one of the one or more blank subframes.

A method performed by a network node is also disclosed. The method comprises determining one or more blank subframes for use for D2D operation for a first D2D enabled node and configuring one or more blank subframes in a first cell and/or on a first carrier frequency, wherein configuring the one or more blank subframes is indicative of that the first D2D enabled node is not and will not be scheduled in DL and/or UL during the one or more blank subframes, and that the first D2D enabled node may perform and/or schedule a D2D operation during at least one of the configured blank subframes.

Moreover, a network node for a wireless communication network is disclosed. The network node is adapted for determining one or more blank subframes for use for D2D operation for a first D2D enabled node and for configuring one or more blank subframes in a first cell and/or on a first carrier frequency, wherein configuring the one or more blank subframes is indicative of that the first D2D enabled node is not and will not be scheduled in DL and/or UL during the one or more blank subframes, and that the first D2D enabled node may perform and/or schedule a D2D operation during at least one of the configured blank subframes.

In addition, there is disclosed a computer program product comprising instructions executable by control circuitry, the instruction causing the control circuitry to carry out and/or control any one of the methods disclosed herein when executed by the control circuitry.

These approaches allow utilizing D2D operation during suitable subframes, e.g. outside of resources usually reserved for D2D operation (e.g., D2D resource pools), providing more flexibility and better resource utilization. In particular, blank subframes, which are not utilised for cellular operation, may be advantageously used for D2D operation. For example, should during cellular operation the occasion arise that blank subframes are to be configured for a D2D enabled node, they may be (at least partially) used for D2D operation.

DETAILED DESCRIPTION

Figure 1:
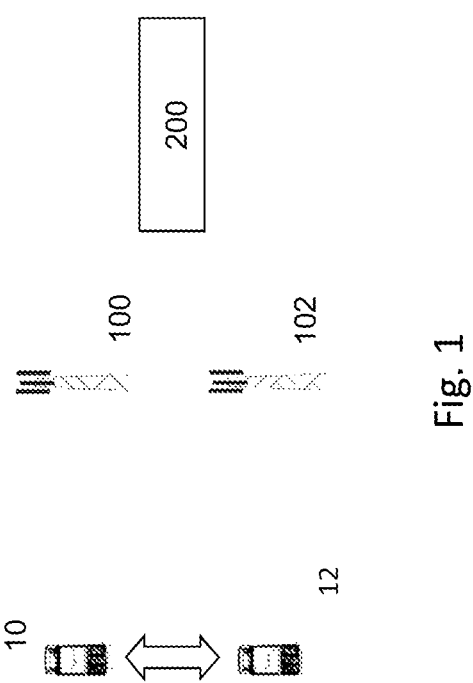
FIG. 1 shows a "Direct mode" data path in the EPS for communication between two D2D enabled nodes or UEs.
Figure 2:
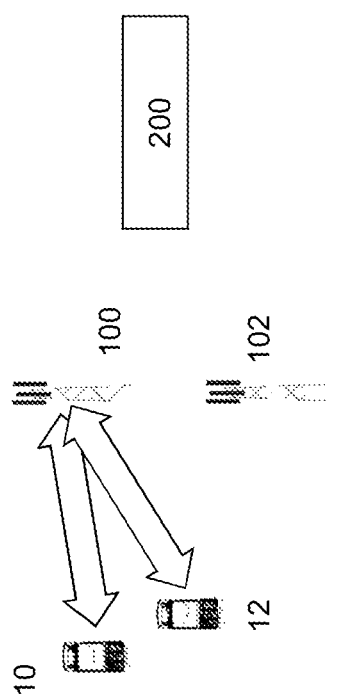
FIG. 2 shows a "Locally-routed" data path in the EPS for communication between two D2D enabled nodes or UEs when D2D enabled nodes or UEs are served by the same eNBs.
Figure 3:
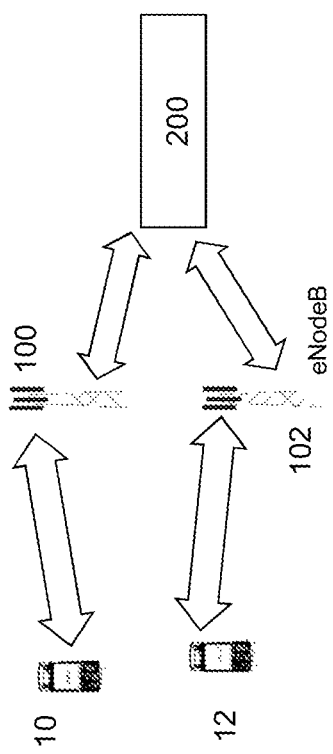
FIG. 3 shows a default data path scenario in the EPS for cellular communication between two D2D enabled nodes or UEs.

In FIGS. 1 to 3, there are shown different setups for communication of user equipments within a wireless communication network. In these figures, the first node or first user equipment UE1 is indicated with reference numeral 10, the second node or second user equipment is indicated with reference numeral 12. A first base station, which may be an eNodeB and/or EPC according to LTE/E-UTRAN, carries the reference numeral 100, whereas a second base station, which may be an eNodeB and/or EPC according to LTE/UTRAN, is referenced with numeral 102. The nodes 100, 102 may be configured as coordinating nodes for D2D communication between the D2D enabled nodes or UEs 10, 12 and may be seen as examples for network nodes. Reference numeral 200 indicates higher layer functions or devices of the network, to which the base stations 100, 102 may be connected or connectable, e.g. LTE packet core elements like SGW (Server GateWay) and/or PGW (PDN GateWay) and/or MME (Mobility Management Entity).

Figure 4:
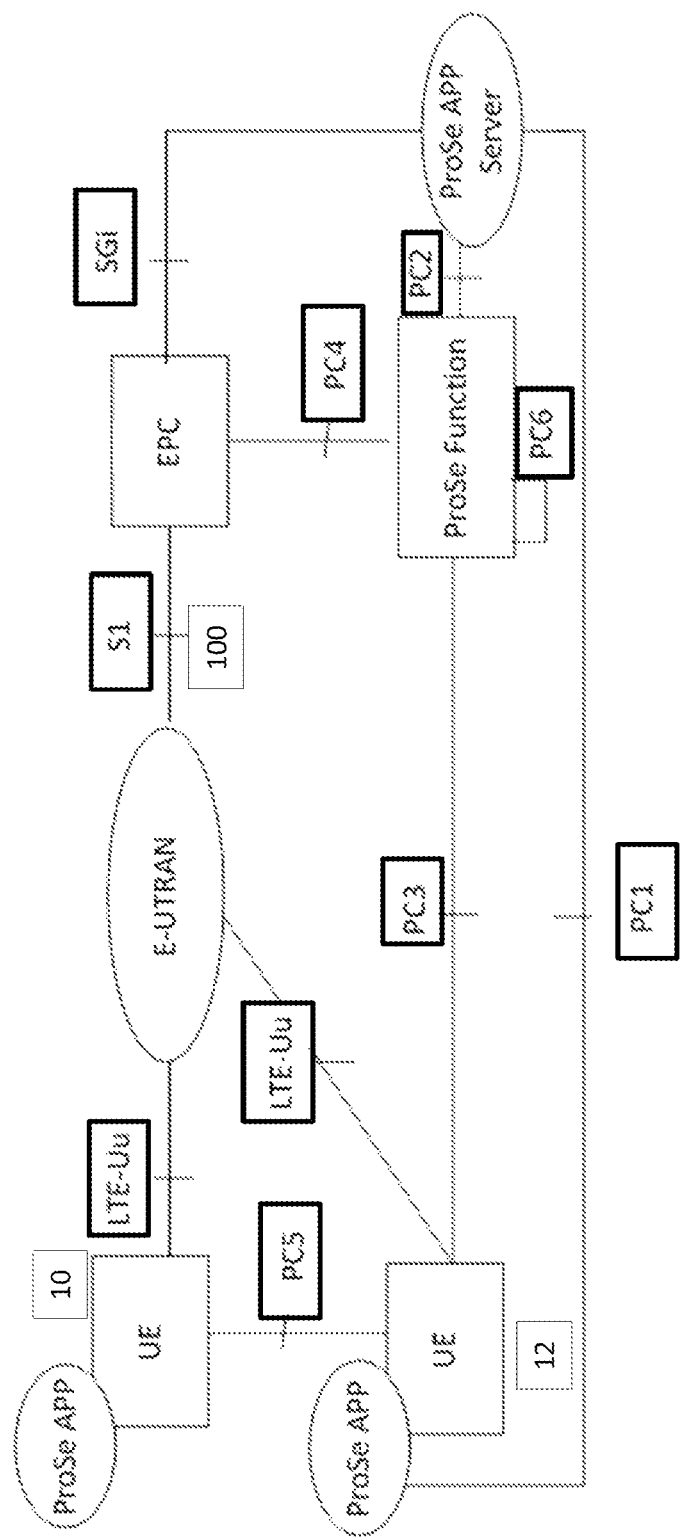
FIG. 4 shows an exemplary D2D architecture.

A more detailed example reference architecture for D2D operation according to one possible LTE/E-UTRAN implementation is illustrated in FIG. 4, in which only a setup with two D2D enabled nodes or UEs 10, 12 connected to a common base station or eNodeB 100 is shown. In FIG. 4, PCn identifies different reference points or interfaces. PC1 refers to a reference point between a ProSe application ProSe APP running on an D2D enabled node or UE 10 or 12, PC2 a reference point between an ProSe Application server and a ProSe function provider on a server or base station side. PC3 indicates a reference point between the D2D enabled node or UE 12 and the ProSE function, e.g. for discovery and/or communication.

PC4 refers to a reference point between the EPC and the ProSe function, e.g. for setting up setting up one-to-one communication between D2D enabled nodes or UEs 10 and 12. PC5 is a reference point between D2D enabled node or UE 10 and D2D enabled node or UE 12, e.g. a first node and a second node involved in D2D communication, which may be used e.g. for direct or relayed communication between the UEs. PC6 identifies a reference point between ProSE functions of different networks, e.g. if D2D enabled nodes or UEs 10, 12 are subscribed to different PLMNs (Public Land Mobile Networks).

SGi indicates an interface which may be used, inter alia, for application data and/or application level control. The EPC (Evolved Packet Core) may generally include a plurality of core packet functions or entities, e.g. MME, SGW, PWG, PCRF (Policy Charging and Rules Function), HSS (Home Subscriber Server), etc. E-UTRAN is the preferred RAT of the arrangement of FIG. 4. LTE-Uu indicates data transmission connections between the D2D enabled nodes or UEs 10, 12 and the base station 100.

Figure 5:
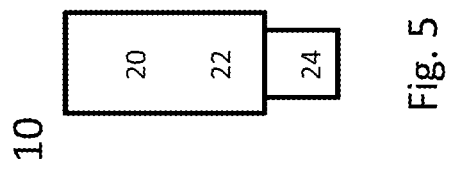
FIG. 5 shows an example of a base station.

FIG. 5 schematically show a base station 10, which in particular may be an eNodeB. Base station 10 comprises control circuitry 20, which may comprise a controller connected to a memory. A configuring unit and/or a determination unit may be comprised in the control circuitry, the latter in particular if the base station is configured as a coordinating node. The control circuitry is connected to control radio circuitry 22 of the base station 10, which provides receiver and transmitter and/or transceiver functionality. It may be considered that control circuitry 20 comprises an extracting unit as described herein, in particular if the base station is configured to participate as a device in D2D communication. An antenna circuitry 24 may be connected or connectable to radio circuitry 22 to provide good signal reception or transmittance and/or amplification.

Figure 6:
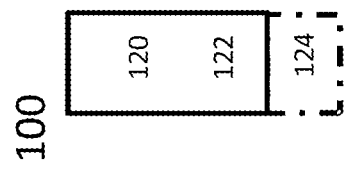
FIG. 6 shows an example of a D2D enabled node or UE.

Moreover, FIG. 6 schematically shows a D2D enabled node or user equipment 100, which may be a node of a device-to-device communication, in closer details. User equipment 100 comprises control circuitry 120, which may comprise a controller connected to a memory. A receiving module and/or transmission module and/or control module may be implemented in the control circuitry 120, in particular as module in the controller.

The user equipment also comprises radio circuitry 122 providing receiving and transmitting or transceiving functionality, the radio circuitry 122 connected or connectable to the control circuitry. An antenna circuitry 124 of the user equipment 100 is connected or connectable to the radio circuitry 122 to collect or send and/or amplify signals. Radio circuitry 122 and the control circuitry 120 controlling it are configured for device-to-device communication, in particular utilizing E-UTRAN/LTE resources as described herein and/or receiving allocation data and/or transmit D2D data based on allocation data.

There is generally disclosed a method performed by a first D2D enabled node. The method my comprise the steps of obtaining a configuration indicative of one or more blank subframes in a first cell and/or on a first carrier frequency, wherein the one or more blank subframes comprise DL and/or UL subframes and the configuration of the one or more blank subframes is indicative of that the first D2D enabled node is not and will not be scheduled in DL and/or UL during the one or more blank subframes. The method may also comprise performing a D2D operation in at least one of the one or more blank subframes. Accordingly, blank subframes with no cellular transmission may be used for D2D operation, instead of being unused.

The D2D operation can be performed if one or more pre-defined conditions are met, e.g. pertaining to one or more measurement gaps and/or their use for measurements. In this way, operational requirements may be taken into account, in particular ensuring reliable measurements.

It may be considered that the D2D operation is on the first carrier frequency and/or a second carrier frequency. This allows flexible use of frequency resources, e.g. in a single carrier or a multiple carrier scenario.

A blank subframe comprised in the one or more blank subframes may further comprise any of:
- a subframe for receiving a broadcast or multicast service, wherein at least the first D2D enabled node is not receiving this service or the subframe does not contain data to receive for the first or any D2D enabled node; and/or
- a positioning subframe in which at least the first D2D enabled node is not receiving the positioning service associated with this positioning subframe; and/or
- an almost blank subframe (ABS), wherein at least the first D2D enabled node is not scheduled to receive and/or transmit data, wherein the ABS subframe may be used for inter-cell interference coordination e.g. to reduce interference to neighbor cells; and/or
- a subframe with low cellular activity or no cellular activity at least for the first D2D enabled node; and/or
- a subframe with best-effort cellular activity at least for the first D2D enabled node. These conditions may hence be taken into account when configuring and/or using blank subframes for D2D operation.

Generally, a blank subframe comprised in the one or more blank subframes may comprise a subframe during which the first D2D enabled node is configured with one or more measurement gaps during which the first D2D enabled node is not performing any cellular transmitting or receiving operation in the first cell and/or on the first carrier frequency and is capable of using its at least one transmitter and/or receiver for D2D operation on the first carrier frequency and/or a second carrier frequency. Accordingly, measurement gaps may be utilized for D2D operation, improving the overall usage of resources.

Alternatively or additionally, performing a D2D operation in a blank subframe comprising one or more measurement gaps may be performed only if the D2D enabled node is not performing any radio measurements in the gap. This may be seen as a conditional performing and/or performing the D2D operation if a pre-defined condition is met. With this approach, unwanted interference with measurements may be avoided or alleviated.

There is also disclosed a D2D enabled node. The D2D enabled node may be adapted for, and/or comprise an obtaining module for, obtaining a configuration indicative of one or more blank subframes in a first cell and/or on a first carrier frequency, wherein the one or more blank subframes comprise DL and/or UL subframes and the configuration of the one or more blank subframes is indicative of that the D2D enabled node is not and will not be scheduled in DL and/or UL during the one or more blank subframes. The D2D enabled node may further be adapted for, and/or comprise a D2D module for, performing a D2D operation in at least one of the one or more blank subframes.

It may be considered that the D2D enabled node is adapted for performing the D2D operation if one or more pre-defined conditions are met.

Generally, the D2D operation may be on the first carrier frequency and/or a second carrier frequency.

It may be considered that a blank subframe comprised in the one or more blank subframes further comprises any of:
  a subframe for receiving a broadcast or multicast service, wherein at least the D2D enabled node is not receiving this service or the subframe does not contain data to receive for the or any D2D enabled node; and/or
  a positioning subframe in which at least the D2D enabled node is not receiving the positioning service associated with this positioning subframe; and/or
  an almost blank subframe (ABS), wherein at least the D2D enabled node is not scheduled to receive and/or transmit data, wherein the ABS subframe may be used for inter-cell interference coordination e.g. to reduce interference to neighbor cells; and/or
  a subframe with low cellular activity or no cellular activity at least for the D2D enabled node (100); and/or
  a subframe with best-effort cellular activity at least for the D2D enabled node.

In a variant, a blank subframe comprised in the one or more blank subframes may comprise a subframe during which the D2D enabled node is configured with one or more measurement gaps during which the D2D enabled node is not performing any cellular transmitting or receiving operation in the first cell and/or on the first carrier frequency and is capable of using its at least one transmitter and/or receiver for D2D operation on the first carrier frequency and/or a second carrier frequency.

Generally, the D2D enabled node, and/or the D2D module, may be adapted for performing a D2D operation in a blank subframe comprising one or more measurement gaps only if the D2D enabled node is not performing any radio measurements in the gap.

Moreover, there is disclosed a method performed by a network node. The method may comprise determining one or more blank subframes for use for D2D operation for a first D2D enabled node and/or configuring one or more blank subframes in a first cell and/or on a first carrier frequency. Configuring the one or more blank subframes may be indicative of that the first D2D enabled node is not and will not be scheduled in DL and/or UL during the one or more blank subframes, and that the first D2D enabled node may perform and/or schedule a D2D operation during at least one of the configured blank subframes.

It may be considered that the configuring is such that the D2D operation can be performed by the first D2D enabled node if one or more pre-defined conditions are met.

The D2D operation may be on the first carrier frequency and/or a second carrier frequency.

A blank subframe comprised in the one or more blank subframes may comprise any of:
  a subframe for receiving of broadcast or multicast service, wherein at least the first D2D enabled node is not receiving this service or the subframe does not contain data for the first or any D2D enabled node to receive; and/or
  a positioning subframe in which at least the first D2D enabled node is not receiving the positioning service associated with this positioning subframe; and/or
  an almost blank subframe (ABS), wherein at least the first D2D enabled node is not scheduled to receive and/or transmit data; and/or
  a subframe with low cellular activity or no cellular activity at least for the first D2D enabled node; and/or
  a subframe with best-effort cellular activity at least for the first D2D enabled node.

Generally, a blank subframe comprised in the one or more blank subframes may further comprises a subframe during which the first D2D enabled node is configured with one or more measurement gaps during which the first D2D enabled node is not performing any cellular transmitting or receiving operation in the first cell and/or on the first carrier frequency, and is capable of using at least one transmitter and/or receiver for D2D operation on the first carrier frequency and/or a second carrier frequency.

Configuring the one or more blank subframes may generally be indicative of that D2D operation in a blank subframe comprising one or more measurement gaps is performed only if the D2D enabled node is not performing any radio measurements in the gap.

A network node for a wireless communication network is further disclosed. The network node may be adapted for, and/or comprise a determining module for, determining one or more blank subframes for use for D2D operation for a first D2D enabled node and/or be adapted for, and/or comprise a configuring module for, configuring one or more blank subframes in a first cell and/or on a first carrier frequency. Configuring the one or more blank subframes may be indicative of that the first D2D enabled node is not and will not be scheduled in DL and/or UL during the one or more blank subframes, and that the first D2D enabled node may perform and/or schedule a D2D operation during at least one of the configured blank subframes.

Configuring may be performed such that the D2D operation can be performed by the first D2D enabled node if one or more pre-defined conditions are met. The D2D operation may be on the first carrier frequency and/or a second carrier frequency. A blank subframe comprised in the one or more blank subframes further comprises any of:
  a subframe for receiving of broadcast or multicast service, wherein at least the first D2D enabled node (100) is not receiving this service or the subframe does not contain data for the first or any D2D enabled node (100) to receive; and/or
  a positioning subframe in which at least the first D2D enabled node (100) is not receiving the positioning service associated with this positioning subframe; and/or
  an almost blank subframe (ABS), wherein at least the first D2D enabled node (100) is not scheduled to receive and/or transmit data; and/or a subframe with low cellular activity or no cellular activity at least for the first D2D enabled node (100); and/or a subframe with best-effort cellular activity at least for the first D2D enabled node.

Generally, a blank subframe comprised in the one or more blank subframes may comprise a subframe during which the first D2D enabled node is configured with one or more measurement gaps during which the first D2D enabled node is not performing any cellular transmitting or receiving operation in the first cell and/or on the first carrier frequency, and is capable of using at least one transmitter and/or receiver for D2D operation on the first carrier frequency and/or a second carrier frequency.

Configuring the one or more blank subframes may be indicative of that D2D operation in a blank subframe comprising one or more measurement gaps is performed only if the D2D enabled node is not performing any radio measurements in the gap.

There is also discussed a computer program product comprising instructions executable by control circuitry, the instruction causing the control circuitry to carry out and/or control any one of the methods disclosed herein when executed by the control circuitry.

In systems with multiple carrier frequencies, a D2D enabled node or UE may operate over two or more carrier frequencies in parallel or in a sequential order, e.g., when performing measurements, transmitting or receiving radio signals or channels. Simultaneous or parallel operation over two or more carrier frequencies generally requires a higher complexity in the D2D enabled node or UE than sequential operation, as well as a more complex receiver structure.

Inter-frequency operation generally refers to performing measurements (e.g., inter-frequency RSRP/RSRQ and RSTD) and/or receiving broadcast channels (e.g., system information reading on PBCH) on a carrier frequency which is different from the serving frequency(-ies). D2D enabled nodes or UEs with a single receiver chain normally require measurement gaps for inter-frequency operation; other D2D enabled nodes or UEs may be always or in certain conditions capable of inter-frequency operation without measurement gaps.

The difference of carrier aggregation (CA) from inter-frequency operation is that the D2D enabled node or UE has a possibility of operating over multiple serving cells or on one or more serving cell(s) which are not the primary serving cell. In such multi-carrier or carrier aggregation cellular system, a carrier is generally termed as a component carrier (CC) or sometimes is also referred to a cell or serving cell. In principle each CC may have multiple cells. The term carrier aggregation (CA) is also called (e.g. interchangeably called) "multi-carrier system", "multi-cell operation", "multi-carrier operation", "multi-carrier" transmission and/or reception. This means the CA may be used for transmission of signaling and data in the uplink and/or downlink directions. One of the CCs is the primary component carrier (PCC) or simply primary carrier or even anchor carrier and may correspond to or define a primary cell.

The remaining ones are called secondary component carrier (SCC) or simply secondary carriers or even supplementary carriers and may correspond to or define one or more secondary or serving cells. Generally the primary or anchor CC carries the essential D2D enabled node or UE specific signaling. The primary CC (aka PCC or PCell) exists in both uplink and downlink directions in CA. In case there is single UL CC the PCell is obviously on that CC. The network may assign different primary carriers to different D2D enabled nodes or UEs operating in the same sector or cell.

The D2D enabled node or UE may not be able to receive cellular signals and D2D signals simultaneously, for example if the D2D enabled node or UE has a single radio receiver resource or generally not sufficient receivers.

This may result in that the D2D enabled node or UE may miss one or both types of signals in case they are required to be received by the D2D enabled node or UE during the same or overlapping time period.

D2D transmissions to be received by the D2D enabled node or UE generally may occur at periodic intervals. If the D2D signal is lost and/or the transmission are not received, then the D2D enabled node or UE has to wait for the next reception occasion, which may take e.g. 40 ms. The D2D signals may also carry critical information such as information related to public safety. Therefore a main purpose of D2D operation to provide public safety information may not be achieved e.g. due to loss of critical D2D signals because of the reception of cellular signals blocking reception of the D2D signals.

The network node or coordinating node or allocating node serving the D2D enabled node or UE may not even be aware of such loss of signals, e.g. cellular data or D2D data. For cellular data, the network node may retransmit the lost data later, when the loss or miss of cellular data is discovered by a higher layer protocol. This may cause excessive delay in delivering data to the UE. The retransmission of data also consumes additional resources and increases overall interference which is degrading the performance.

There is described a concept according to which a network node (in particular an allocation node or coordinating node) configures a D2D enabled node or UE with one or more blank subframes, during which the D2D enabled node or UE does not perform cellular operation or is scheduled not to transmit or receive cellular signals. Instead, the D2D enabled node or UE may be adapted to use these blank subframes for D2D operations. Aspects of the method may be implemented in both the D2D enabled node or UE and the network node.

Steps performed in a network node serving a D2D enabled node or UE may comprise:

Determining, based on one or more criteria, one or more blank subframes for use by the D2D enabled node or UE operating in a first cell on a first carrier frequency, wherein during the one or more blank subframes the D2D enabled node or UE, while performing D2D operation, does not perform cellular operation;

Configuring the determined one or more blank subframes for use by the D2D enabled node or UE operating in the first cell on the first carrier frequency, for performing at least the D2D operation;

(Optional) configuring D2D subframes so that they overlap with the blank subframes.

(Optional) configuring one or more D2D radio signal/channel transmissions during the blank subframes.

The steps performed in a D2D enabled node or UE served by a network node may comprise:

Obtaining one or more blank subframes for use by the D2D enabled node or UE operating in a first cell on a first carrier frequency, wherein during the said blank subframe the D2D enabled node or UE, while performing D2D operation, does not perform cellular operation;

Using the obtained one or more blank subframes for performing at least the D2D operation.

Transmitting (optionally) information about one or more blank subframes not used by the D2D enabled node or UE for D2D operation.

In the following, methods are described for a network node (e.g., eNodeB or controlling node or allocation node) for enabling one or more first D2D enabled nodes or UEs using their receiver/s and/or transmitter/s for a D2D operation. Steps performed on the network side, e.g. by the network node, are identified with NW, and may comprise any one or any suitable combination of:

Step 1 (NW): Determining, e.g. based on one or more criteria, one or more blank subframes for use by at least one first D2D enabled node or UE operating in a first cell on a first carrier frequency, wherein
  i. the one or more blank subframe comprise DL and/or UL subframes and the configuring the one or more blank subframes is indicative of that the first D2D enabled node or UE is not and/or will not be scheduled for cellular operation in DL and/or UL, respectively, during the one or more blank subframes, and
  ii. the first D2D enabled node or UE may perform and/or schedule a D2D operation during at least one of the configured blanks subframes;

Step 2 (NW): Configuring the determined one or more blank subframes, e.g. in the first cell and/or on the first carrier frequency, e.g. by transmitting corresponding allocation data to the D2D enabled node or UE and/or scheduling the network and/or network node to not transmit cellular data to the first D2D enabled node or UE, in particular for the first cell and/or first carrier frequency, during the one or more blank subframes.

Step 3 (NW) (Optional): Implicitly or explicitly configuring one or more D2D subframes for D2D operation at least for the first D2D enabled node or UE, wherein the D2D subframes are overlapping fully or at least in part with the one or more blank subframes, in particular for the first D2D enabled node or UE.

Step 4 (NW) (Optional): Configuring one or more D2D radio signal/channel transmissions in at least one of the blank subframes or during the time fully or partly overlapping with the blank subframes, in particular for the first D2D enabled node or UE.

It should be noted that the D2D operation may be on the first carrier frequency and/or a second carrier frequency.

Methods of determining and configuring blanks subframes (Steps 1 and 2) may comprise any of:

The network node is configuring one or more blank subframes in a first cell on a first carrier frequency, wherein
  i. the one or more blank subframe comprise DL and/or UL subframes and the configuring the one or more blank subframes is indicative of that the first D2D enabled nodes or UEs are not and will not be scheduled for cellular operation in DL and/or UL, respectively, during the one or more blank subframes, and
  ii. the first D2D enabled nodes or UEs can perform a D2D operation during at least one of the configured blanks subframes.

The blank subframes can be cell specific (i.e. apply for all D2D enabled nodes or UEs in a cell) or can be D2D enabled node or UE specific or a combination thereof (e.g. some are cell specific and some are D2D enabled node or UE specific). This will be explained with several examples.

The network node may use one or more of the following criteria for determining/deciding and/or to configure one or more blank subframes; determining and/or configuring may be based on one or more such criteria. Examples of criteria are:

UE radio receiver capability: The blank subframes are configured only if D2D enabled node or UE cannot operate D2D and cellular in the same subframe or during overlapping time.

Type of D2D operation: The blank subframes are configured if D2D operation is required due to critical scenario such as under warning or emergency situation.

Available resources for cellular operation: The blank subframes are configured if the network node has sufficient resources (e.g. resource blocks etc.) to serve D2D enabled nodes or UEs during non-bank subframes to compensate the network node's inability to serve D2D enabled node or UE with cellular data during blank subframes.

Amount of cellular data/traffic load: The blank subframes are configured if there are fewer D2D enabled nodes or UEs (i.e. below a threshold) involved in cellular operations and/or if the buffer sizes of D2D enabled nodes or UEs containing cellular data are below their respect thresholds.

The blanks subframes may be, or may need to be, configured for their original purpose too, e.g., for interference coordination in heterogeneous deployments, for positioning, etc. but the network node may determine that they can also be used for D2D, e.g., when there is at least one D2D-capable D2D enabled node or UE in the cell, etc.

In one embodiment, the first D2D enabled nodes or UEs are within the coverage of the first cell, and which can be served by the first cell or can be in RRC_IDLE state. In another embodiment, the first D2D enabled nodes or UEs may be in CA and the first cell may be one of the serving cells (e.g., PCell or SCell) of the first UEs.

In another embodiment, the network node, prior to configuring, may determine the set or setup of the first D2D enabled node or UE, e.g., based on their D2D capabilities. In yet another embodiment, the configuring step may be performed in response to determining by the network node the presence of at least one D2D enabled node or UE in the first cell.

In another embodiment, the step of configuring the one or more blank subframes may further comprise sending the configuration to the first UE, to another UE, or to another network node (e.g., core network node, MME, coordinating node, another eNodeB, etc.) via broadcast, multicast or unicast PHY or higher-layer signaling.

The configuration may also comprise additional information, e.g., any of:
  Subframe numbers (e.g. #3 and #7) of the blank subframes; otherwise D2D enabled node or UE may assume certain pre-defined or default subframes as blank subframes.
  Reference time when the blank subframes are to start, e.g. frame number such as system frame number (SFN)=4.
  Type of the blank subframes, e.g., MBSFN, ABS (Almost Blank Subframe), etc.
  An indication of that the one or more blank subframes can be used for D2D operation by the first UEs,
  A condition under which the one or more blank subframes can be used for D2D operation by the UEs,
  A type of D2D operation for which the blank subframes can be used,
  All or a subset of the configured blank subframes that can be used for D2D operation, The one or more bank subframes are configured and/or used for D2D only in one or more specific frames (e.g. in frames with SFNmod 2=0) or in every frame over certain time period etc.

The blank subframes may be cell-specific or D2D enabled node or UE-specific.

A blank subframe comprised in the one or more blank subframes may further comprise any of:

a. Subframe for receiving of broadcast or multicast service (e.g., MBSFN) where at least the first D2D enabled nodes or UEs are not receiving this service or the subframe does not contain data for the first or any D2D enabled nodes or UEs to receive (e.g., MBSFN with no PMCH), b. Positioning subframe in which at least the first D2D enabled nodes or UEs are not receiving the positioning service associated with this positioning subframe, c. Almost blank subframe (ABS) where at least the first D2D enabled nodes or UEs are not scheduled to receive and/or transmit data (i.e. no cellular operation), wherein the ABS subframe may be used for inter-cell interference coordination e.g. to reduce interference to neighbor cells, d. A subframe with low cellular activity or no cellular activity at least for the first UEs, e. A subframe with best-effort cellular activity at least for the first UEs, f. A subframe during which the one or more first D2D enabled nodes or UEs are configured with measurement gaps during which the one or more first D2D enabled nodes or UEs are not performing any cellular transmitting or receiving operation in the first cell and/or on the first carrier frequency, and capable of using their at least one transmitter and/or receiver for D2D operation on the first carrier frequency and/or a second carrier frequency.

In a further embodiment, a measurement gap configuration (e.g., a configuration pertaining to one or more subframes comprising one or more measurement gaps) may also comprise and/or pertain to and/or be conditional to additional D2D-related information, e.g., any of:

purpose of the measurement gaps (e.g., for D2D operation only, for both D2D and cellular operation, for D2D operation in best effort, for D2D operation but cellular operation is best effort, for cellular operation only, etc.), and/or a condition under which the measurement gap may be used for D2D operation e.g. only if the D2D enabled node or UE is not performing any radio measurements in a gap, and/or carrier frequency on which D2D operation may be performed (e.g., the serving or non-serving carrier frequency), Certain gaps in a measurement gap pattern can be used for D2D operation. For example, the D2D enabled node or UE can be configured by the network node or based on a pre-defined rule that every other gap can be used for D2D operation and the remaining ones for performing radio measurements (i.e. inter-frequency and/or inter-RAT measurements). In another example the D2D enabled node or UE may be allowed to use X % and (100−X %) of the total number of gaps in a pattern for D2D operation and for performing radio measurements, where X is pre-defined or configured by the network node.

Methods of configuring D2D subframes adaptively to the blank subframe configuration (Step 3) may be found described in more detail below.

In the optional Step 2, the network node may further implicitly or explicitly configure one or more subframes for D2D operation (comprising transmission and/or reception of radio signals/channels) at least for the first UEs, wherein the D2D subframes are overlapping fully or at least in part with the one or more blank subframes.

Explicitly configuring may further comprise sending the D2D configuration (with the D2D subframes overlapping with the blank subframes) to least one other node (e.g., to at least one first UE, to another eNodeB, or to coordinating node) via broadcast, multicast, or dedicated signaling.

Implicitly configuring may be implied e.g. by pre-defined rule(s) or condition(s). For example, The D2D enabled node or UE may be pre-configured with one or more subframes for D2D operation. These subframes are used by the D2D enabled node or UE for D2D operation only when the D2D enabled node or UE is also configured with one or more blank subframes that fully or partly overlap with the subframes for D2D operation.

The blank subframes contain at least some subframes where D2D operation is allowed, e.g., subframe # X may be not allowed for D2D operation due to critical cellular operation or signals in that subframe.

Methods of configuring D2D signals in blank subframes (Step 4) may be found described in more detail in the following.

For some D2D UEs, the network node may control D2D transmission configuration, e.g., by configuring D2D transmission resources and/or configuring the D2D enabled node or UE to transmit certain D2D signals. Such control may be performed via D2D resource grant procedure, via broadcast/multicast/unicast of resource configuration of certain D2D signal transmissions, via dedicated D2D enabled node or UE control of its D2D operation.

In one embodiment, the network node may configure blank subframes as in Steps 1/2 but may also configure D2D signal transmission in at least one of such subframes. For example, a blank MBSFN subframe may contain only CRS signals in the first symbols, therefore the network node may configure one or more of the first D2D enabled nodes or UEs to transmit D2D signals (e.g., D2D synchronization or discovery signals or D2D control or even D2D data channels) during such subframes during the time (e.g., in symbols or in the resource elements not occupied by cellular radio signal transmissions such as CRS in this example).

In another example, a downlink ABS subframe may also contain some signals/channel, e.g., CRS and MIB but not all resource elements are occupied by these cellular transmissions, in fact most of the resource elements are not occupied and in these resource elements D2D transmissions may be configured.

In this part, methods which may be performed by the D2D enabled node or UE are described. The method may pertain to performing a D2D operation. The methods in a first D2D enabled node or UE may comprise any one or any combination of the following steps (UE identifies that they are performed on the D2D enabled node or UE side).

Step 1 (UE): Obtaining a configuration indicative of one or more blank subframes in a first cell on a first carrier frequency, wherein the one or more blank subframes comprise DL and/or UL subframes and the configuration the one or more blank subframes is indicative of that the first D2D enabled node or UE is not and will not be scheduled for cellular operation in DL and/or UL, respectively, during the one or more blank subframes. The configuration may be obtained by receiving corresponding allocation data, which may be transmitted by a network node, e.g. an eNodeB and/or allocation node and/or coordinating node.

Step 2 (UE): Performing a D2D operation during at least one of the one or more blank subframes, in particular based on the configuration and/or allocation data.

It should be noted that the D2D operation may be on the first carrier frequency and/or a second carrier frequency.

Methods of obtaining configuration indicative of blank subframes (Step1) may be found described in more detail below.

In Step 1, the first D2D enabled node or UE is obtaining a configuration indicative of one or more blank subframes in a first cell on a first carrier frequency, wherein the one or more blank subframe comprise DL and/or UL subframes and the configuring the one or more blank subframes is indicative of that the first D2D enabled node or UE is not and will not be scheduled with cellular operation in DL and/or UL, respectively, during the one or more blank subframes.

Blank subframes may be as defined herein.

In one embodiment, the first D2D enabled node or UE may be within the coverage of the first cell and can be served by the first cell or can be in RRC_IDLE state.

In another embodiment, the first D2D enabled node or UE may be in CA and the first cell may be one of the serving cells (e.g., PCell or SCell) of the first UE.

The obtaining of a configuration indicative of one or more blank subframes may be further based on, e.g., any one or more of: D2D enabled node or UE measurements, D2D enabled node or UE autonomous determination, historical data, pre-defined rule, implicit or explicit signaling received from another network node or from another D2D enabled node or UE.

Methods of performing D2D operation during blank subframes (Step 2) may be found described in more detail below.

In this step, the D2D enabled node or UE may further select which subframes are to be used for D2D operation, prior to performing the D2D operation.

For example, the D2D enabled node or UE may further obtain a second configuration which is comprised at least in part of the blank subframe configuration (first configuration), for performing D2D operation, e.g.:
  any blank subframe may be used for D2D operation by the first D2D enabled node or UE,
  only an indicated subset of the configured blank subframes may be used for D2D operation by the first D2D enabled node or UE,
  the second configuration comprises the time instances for D2D operation of the first UE, wherein the time instances are selected as the overlap of the blank subframes (first configuration) and a set of subframes (a third configuration, e.g., comprising a resource pool received via broadcast) that a D2D enabled node or UE may select for its D2D operation,
  blank subframes which are satisfying certain criteria or conditions may be used for D2D operation.

The obtaining of a second configuration may be based on any one or more of: D2D enabled node or UE measurements, historical data, autonomous detection by the D2D enabled node or UE, a pre-defined rule, set of conditions, explicit signaling indicating which subframes can be used for D2D operation (e.g., a bitmap, a rule, condition, an indication) from a network node or from another UE.

The D2D enabled node or UE may further take into account its radio receiver capability for using the blank subframes for D2D operation. For example if the D2D enabled node or UE detects based on its receiver implementation that it cannot simultaneously receive D2D signals and cellular signals, then the D2D enabled node or UE will decide to use one or more blank subframes for D2D operation.

While performing a D2D operation during blank subframes, the D2D enabled node or UE may be required to meet a certain set of pre-defined requirements. This set of requirements may be the same (in one example) or may be different (in another example) from the requirements the D2D enabled node or UE would have to meet when performing the D2D operation during subframes which are not blank subframes.

The D2D enabled node or UE may also be performing D2D operation during a part of a blank subframe. For example, in a blank MBSFN subframe the D2D enabled node or UE may still be performing measurements in the first symbol on CRS signals, but it may perform D2D operation in other symbols of such MBSFN subframes or the symbols relevant for D2D operation (e.g., the symbols comprising D2D signals).

Methods in a D2D enabled node or UE of updating usage of blank subframes may be found described in more detail below.

The D2D enabled node or UE may determine the usage of one or more blank subframes for D2D operation. The term 'usage' may mean using by and/or an amount or measure of us by this D2D enabled node or UE and/or other UEs. Further, usage for D2D transmission and/or D2D reception may be monitored separately and/or type of transmissions (e.g., broadcast, multicast, or unicast).

The determining may further comprise determining one or more parameter describing the usage of the one or more blank subframes, e.g.:
  Number or percentage or ratio of the blank subframes used for D2D operation(s),
  Number or percentage or ratio of RBs in the blanks subframes used for D2D operation(s),
  Interference conditions in the blank subframes used for D2D, e.g., total interference or interference due to a specific D2D operation or specific D2D enabled node or UE or even interference due to cellular operation of one or more D2D enabled nodes or UEs.

The determining may be performed periodically, upon a condition, upon a request from another node or an application, etc.

The D2D enabled node or UE may also monitor the usage of the blank subframes for D2D, e.g., periodically, upon a condition, upon a request from another node or application, etc.

The result of determining or monitoring may be stored in a storage like a memory, buffer, internal or external memory, history, database, etc. The D2D enabled node or UE may be adapted to compare the result of determining/monitoring with the usage of blank subframes actually configured by the network node (e.g., comparing to the total number of configured blank subframes) or to a reference usage level (e.g., a threshold).

The result of the monitoring and/or comparison may be signaled to another D2D enabled node or UE or to a network node.

The D2D enabled node or UE based on the comparison may take one or more of the following action:
  If the usage is below a threshold, the D2D enabled node or UE may inform the network node which would allow the network to adapt D2D configuration and/or blank subframe configuration, In case the D2D enabled node or UE does not need blank subframes for D2D operation at all then the D2D enabled node or UE may also inform this to the network node. For example if the D2D enabled node or UE has separate radio receivers for receiving D2D and cellular signals then the D2D enabled node or UE may be able to simultaneously receive both types of signals.

In case the D2D enabled node or UE does not any more need blank subframes for D2D operation then the D2D enabled node or UE may also inform this to the network node.

In case the D2D enabled node or UE needs only subset of blank subframes for D2D operation then the D2D enabled node or UE may also inform this to the network node.

The D2D enabled node or UE may also inform the network node the type of blank subframes the D2D enabled node or UE is using for D2D operation and/or the type of blank subframes the D2D enabled node or UE is not using for D2D operation e.g. using only measurement gaps for D2D operation and/or not using blank MBSFN subframes for D2D operation.

The network node may receive any one or more of the above set of information from one or plurality of UEs. The network node may take into account said information received from one or plurality of D2D enabled nodes or UEs to adapt the blank subframe configuration and/or D2D subframe configuration. It may also inform the D2D enabled nodes or UEs about the adapted or updated blank subframe configuration. In this way the network node is able to maintain the configuration of adequate number of blank subframes in a cell to be used for D2D operation.

Figure 7B:
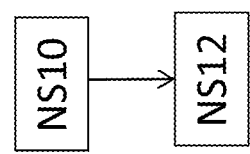
FIG. 7b shows a diagram for a method performed by a network node.
Figure 7A:
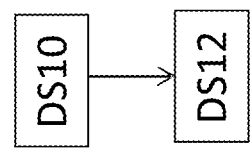
FIG. 7a shows a diagram for a method performed by a D2D enabled node.

FIG. 7a shows a diagram of a method performed by a first D2D enabled node. The method comprises the action DS10 of obtaining a configuration indicative of one or more blank subframes in a first cell and/or on a first carrier frequency, wherein the one or more blank subframes comprise DL and/or UL subframes and the configuration of the one or more blank subframes is indicative of that the first D2D enabled node is not and will not be scheduled in DL and/or UL during the one or more blank subframes. The method may also comprise the action DS12 of performing a D2D operation in at least one of the one or more blank subframes.

FIG. 7b shows a diagram of a method performed by a network node. The method comprises An action NS10 of determining one or more blank subframes for use for D2D operation for a first D2D enabled node as well as an action NS12 of configuring one or more blank subframes in a first cell and/or on a first carrier frequency. Configuring the one or more blank subframes is indicative of that the first D2D enabled node is not and will not be scheduled in DL and/or UL during the one or more blank subframes, and that the first D2D enabled node may perform and/or schedule a D2D operation during at least one of the configured blank subframes.

Figure 8B:
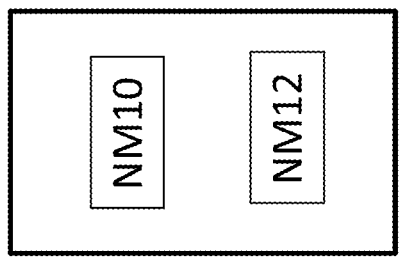
FIG. 8b shows an example of a network node.
Figure 8A:
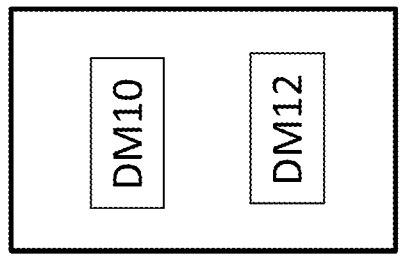
FIG. 8a shows an example of a D2D enabled node.

FIG. 8a shows an example of a D2D enabled node. The D2D enabled node may be a user equipment 100 described herein. The D2D enabled node comprises an obtaining module DM10 for performing action DS10. The D2D enabled node may also comprise a D2D module DM12 for performing action DS12.

FIG. 8b shows an example of a network node. The network node may be a base station 10 as described herein. The network node comprises a determining module NM10 for performing action NS10. The network node may also comprise a configuring module NM12 for performing action NS12.

The approaches described may allow

More efficient and dynamic radio resource utilization, making them available for D2D operation.

Improved D2D performance.

The method avoids the situation where D2D enabled node or UE would miss cellular operation without the network node knowing this.

Using blank subframes (e.g., MBSFN subframes, ABS subframes, etc.) for D2D transmissions.

Well defined D2D enabled node or UE behavior in terms of D2D and cellular operations.

A method E1 is described, which may be performed by and/or in a network node (e.g., eNodeB or controlling node or allocation node). The method may be for enabling one or more first D2D enabled nodes or UEs to use their receiver and/or transmitter for a D2D operation and/or for D2D operation in a wireless communication network, comprising the steps of:

a. Determining, e.g. based on one or more criteria, one or more blank subframes for use for D2D operation b. Configuring one or more blank subframes, in particular in a first cell on a first carrier frequency, wherein i. the one or more blank subframe may comprise DL and/or UL subframes and/or the configuring the one or more blank subframes may be indicative of that the first D2D enabled nodes or UEs are not and will not be scheduled in DL and/or UL, respectively, during the one or more blank subframes, and ii. the first D2D enabled nodes or UEs may perform and/or schedule a D2D operation during at least one of the configured blanks subframes.

[E1a] The method of E1, further comprising implicitly or explicitly configuring one or more subframes for D2D operation at least for the one or more first D2D enabled nodes or UEs overlapping fully or at least in part with the one or more blank subframes.

[E1b] The method of E1 or E1b, wherein the D2D operation can be performed by the first D2D enabled nodes or UEs if one or more pre-defined conditions are met.

E2. The method of any one of E1, E1a, E1b, wherein the at least one first D2D enabled nodes or UEs are selected based on their D2D capability and/or the configuring step is performed in response of determining by the network node the presence of at least one D2D enabled node or UE in the first cell.

E3. The method of any one of E1 to E2, wherein the D2D operation is on the first carrier frequency and/or a second carrier frequency.

E4. The method of any one of E1 to E3, wherein a blank subframe comprised in the one or more blank subframes further comprises any of:

c. Subframe for receiving of broadcast or multicast service (e.g., MBSFN) where at least the first D2D enabled nodes or UEs are not receiving this service or the subframe does not contain data for the first or any D2D enabled nodes or UEs to receive (e.g., MBSFN with no PMCH), d. Positioning subframe in which at least the first D2D enabled nodes or UEs are not receiving the positioning service associated with this positioning subframe, e. Almost blank subframe (ABS) where at least the first D2D enabled nodes or UEs are not scheduled to receive and/or transmit data, wherein the ABS subframe may be used for inter-cell interference coordination e.g. to reduce interference to neighbor cells, f. A subframe with low cellular activity or no cellular activity at least for the first UEs, g. A subframe with best-effort cellular activity at least for the first UEs.

E5. The method of any one of E1 to E4, wherein a blank subframe comprised in one or more blank subframes further comprises a subframe during which the one or more first D2D enabled nodes or UEs are configured with measurement gaps during which the first D2D enabled nodes or UEs are h. not performing any cellular transmitting or receiving operation in the first cell and/or on the first carrier frequency, and i. capable of using their at least one transmitter and/or receiver for D2D operation on the first carrier frequency and/or a second carrier frequency.

E6. The method of any one of E1 to E5, wherein the measurement gap configuration comprises also the purpose of the measurement gaps (e.g., for D2D operation or for both D2D and cellular operation).

E7. The method of any one of E1 to E6, wherein the blank subframe is cell-specific or UE-specific.

E8. The method of any one of E1 to E7, wherein the configuring also comprises configuring that the one or more blank subframes can be used for D2D operation by the at least one first D2D enabled nodes or UEs.

[E8a] The method any one of E1 to E8, wherein the configuring for using for D2D operation further comprises configuring transmission by at least one of the first D2D enabled nodes or UEs of one or more D2D radio signals or channels in at least one blank subframe.

E9. The method of any of E1 to E8, wherein the configuration is sent to another node (e.g., at least one of the first UEs, neighbor eNodeB, or coordinating node).

UE/D2D enabled node-related variants may comprise:

F1 A method in and/or performed by a first D2D enabled node or UE for performing a D2D operation, comprising the steps of:

j. Obtaining a configuration indicative of one or more blank subframes, in particular in a first cell and/or on a first carrier frequency, wherein the one or more blank subframes comprise DL and/or UL subframes and the configuring the one or more blank subframes is indicative of that the first D2D enabled node or UE is not and will not be scheduled in DL and/or UL, respectively, during the one or more blank subframes.

k. Performing a D2D operation in at least one of the one or more blank subframes.

[F1a] The method of F1, further obtaining a configuration for one or more subframes for D2D operation at least for the first D2D enabled node or UE overlapping fully or at least in part with the one or more blank subframes, wherein the obtaining may be based on D2D enabled node or UE measurements, pre-defined rule, implicit or explicit signaling from another network node or from another D2D enabled node or UE.

[F1b] The method of F1 or F1a, wherein the D2D operation can be performed if one or more pre-defined conditions are met.

F2 The method of any one of F1 to F1b, wherein the obtaining is based on any one or more of: D2D enabled node or UE radio measurements, pre-defined configuration, explicit or implicit indication from a network node, or explicit or implicit indication from another D2D enabled node or UE.

F3 The method of any one of F1 to F2, wherein the first cell is a serving cell of the first UE.

F4 The method of any one of F1 to F3, wherein the D2D operation is on the first carrier frequency and/or a second carrier frequency.

F5 The method of any one of F1 to F4, wherein a blank subframe comprised in the one or more blank subframes further comprises any of:

l. Subframe for receiving of broadcast or multicast service (e.g., MBSFN) where at least the first D2D enabled node or UE is not receiving this service or the subframe does not contain data to receive for the first or any D2D enabled node or UE (e.g., MBSFN with no PMCH), m. Positioning subframe in which at least the first D2D enabled node or UE is not receiving the positioning service associated with this positioning subframe, n. Almost blank subframe (ABS) where at least the first D2D enabled node or UE is not scheduled to receive and/or transmit data, wherein the ABS subframe may be used for inter-cell interference coordination e.g. to reduce interference to neighbor cells, o. A subframe with low cellular activity or no cellular activity at least for the first D2D enabled node or UE, p. A subframe with best-effort cellular activity at least for the first D2D enabled node or UE, F6 The method of any one of F1 to F5, wherein a blank subframe comprised in one or more blank subframes further comprises a subframe during which the first D2D enabled node or UE is configured with measurement gaps during which the first D2D enabled node or UE is q. not performing any cellular transmitting or receiving operation in the first cell and/or on the first carrier frequency, and r. capable of using its at least one transmitter and/or receiver for D2D operation on the first carrier frequency and/or a second carrier frequency.

F7 The method of any one of F1 to F6, wherein the measurement gap configuration comprises also the purpose of the measurement gaps (e.g., for D2D operation or for both D2D and cellular operation).

F8 The method of any one of F1 to F7, wherein the blank subframe is cell-specific or D2D enabled node or UE-specific.

F9 The method of any one of F1 to F8, wherein the obtained configuration also comprises an indication of that the one or more blank subframes can be used for D2D operation by the first D2D enabled node or UE.

F10 The method of any one of F1 to F9, wherein the configuration is sent to another node (e.g., to a network node or to another D2D enabled node or UE).

F11 The method of any one of F1 to F10 or E1 to E9, further comprising determining usage of blank subframes for D2D and signaling the result of the determining to another node.

There is also disclosed a D2D enabled node, which may be adapted to perform any one or any one combination of the methods and/or comprise any one or any one combination of the features described herein in the context of a D2D enabled node.

There is also disclosed a network node, which may be adapted to perform any one or any one combination of the methods and/or comprise any one or any one combination of the features described herein in the context of a network node.

There is also disclosed a method in a network, which may combine any of the steps of the methods for a D2D enabled node and a network node described herein.

There are also disclosed one or more virtual devices comprising suitable modules adapted to perform the steps of any of the methods described herein.

A receiver or receiver chain may generally be provided by a transceiver arrangement, which may have transmitting capabilities included, or as a separate arrangement, which may be implemented without having transmitting capacities included.

A measurement gap may refer to a time gap or interval, in which no transmission and reception happens, in particular regarding a serving cell or a given carrier. Since there is no signal transmission and reception during the gap (at least in the serving cell or given carrier), a D2D enabled node or D2D enabled node or UE can switch to another or a target cell or carrier and/or perform a measurement on the target cell or carrier, e.g. for signal quality, utilizing the same receiver.

Generally, there is also disclosed a computer program product comprising instructions executable by control circuitry and/or a computing device, the instruction causing the control circuitry and/or computing device to carry out and/or control any one of the methods described herein when executed by the control circuitry and/or computing device. The control circuitry and/or computing device may be implemented in any one or more than one of the nodes to carry out and/or control corresponding methods or method steps.

Modules performing method steps described herein may generally be implemented in software and/or hardware and/or firmware in and/or on corresponding nodes. Modules of or on or in one node may be implemented in a common module or flow and/or in parallel and/or independent modules or flows.

Device-to-device (D2D). In some examples, the terms 'D2D' or 'proximity service' (ProSe) or 'peer-to-peer communication' may be used interchangeably.

A D2D enabled node may be a UE, which may be D2D capable, and may be referred to as D2D device or D2D capable node or UE. It may comprise any entity or device or node capable of at least receiving or transmitting radio signals on a direct radio link, i.e., between this entity and another D2D capable entity. A D2D-capable device or D2D enabled node may for example be comprised in or comprise a cellular UE, PDA, a wireless device, laptop, mobile, sensor, relay, D2D relay, a small base station employing a UE-like interface, etc. A D2D enabled node or UE is able to support at least one D2D operation. A D2D enabled node may generally be adapted for cellular operation and/or communication in a wireless communication network.

A D2D operation may comprise any action or activity related to D2D, e.g., transmitting or receiving a signal/channel type for D2D purpose, transmitting or receiving data by means of D2D communication, transmitting or receiving control or assistance data for D2D purpose, transmitting or receiving a request for control or assistance data for D2D, selecting a D2D operation mode, initiating/starting D2D operation, switching to D2D operation mode from a cellular operation mode, configuring receiver or transmitter with one or more parameters for D2D.

D2D operation may be for a commercial purpose or to support public safety, using the data related to D2D. D2D operation may or may not be specific to a certain D2D service. A D2D receive operation may be, and/or be comprised in, a D2D operation, which may, in one example, also involve other than D2D receive operations. A D2D operation may generally be performed or performable by a D2D enabled node or UE. A D2D receive operation may comprise receiving, by a D2D enabled node, of D2D data and/or signals. A D2D transmit operation may comprise, transmitting, by a D2D enabled node, of D2D data and/or signals.

Cellular operation (in particular by UE) may comprise any action or activity related to a cellular network (any one or more RATs). Some examples of cellular operation may be a radio signal transmission, a radio signal reception, performing a radio measurement, performing a mobility operation or RRM related to a cellular network.

D2D transmission may be any transmission by a D2D enable node or device and/or in a D2D operation or mode or communication. Some examples of D2D transmission may comprise physical signals or physical channels, dedicated or common/shared, e.g., reference signal, synchronization signal, discovery channel, control channel, data channel, broadcast channel, paging channel, scheduling assignment (SA) transmissions, etc.

A D2D transmission on a direct radio link may be intended for receiving by another D2D device. A D2D transmission may be a unicast, groupcast, or broadcast transmission. A D2D transmission may be on the uplink time-frequency resources of a wireless communication system.

A coordinating or controlling node may be a node or network node that schedules, decides, at least in part, or selects or allocates and/or schedules time-frequency resources to be used for at least one of: cellular transmissions and D2D transmissions. The coordinating node may also provide the scheduling information to another node such as another D2D device, a cluster head, a radio network node such as eNodeB, or a network node (e.g. a core network node, MME, positioning node, D2D server, RNC, SON, etc.).).

The coordinating node may communicate with a radio network node. It may be envisioned that a coordinating node may also perform coordination for one or more UEs. The coordination may be performed in a centralized or distributed manner. A coordinating node may provide the functionality of an allocation node.

Radio spectrum: Although at least some of the embodiments are described for D2D transmissions in the UL spectrum (FDD) or UL resources (TDD), the embodiments are not limited to the usage of UL radio resources, neither to licensed or unlicensed spectrum, or any specific spectrum at all.

A cellular network or wireless communication network may comprise e.g. an LTE network (FDD or TDD), UTRA network, CDMA network, WiMAX, GSM network, any network employing any one or more radio access technologies (RATs) for cellular operation. The description herein is given for LTE, but it is not limited to the LTE RAT.

RAT (radio access technology) may generally include: e.g. LTE FDD, LTE TDD, GSM, CDMA, WCDMA, WiFi, WLAN, WiMAX, etc.

A network node may be a radio network node or another network node, which may be an allocation node or coordinating node. Some examples of the radio network node are a radio base station, eNodeB, a relay node, an access point, a cluster head, RNC, etc. The radio network node may be comprised in a wireless communication network and may also support cellular operation. Some examples of a network node, which is not a radio network node may comprise: a core network node, MME, a node controlling at least in part mobility of a wireless device, SON node, O&M node, positioning node, a server, an application server, a D2D server (which may be capable of some but not all D2D- related features), a node comprising a ProSe function, a ProSe server, an external node, or a node comprised in another network.

A network node may be considered to be serving a D2D enabled node or UE, if it provides a cell of a cellular network to the served node or D2D enabled node or UE and/or is connected or connectable to the D2D enabled node or UE via and/or for transmission and/or reception and/or UL and/or DL data exchange or transmission.

Multiple carrier frequencies or functionality may refer to any of: different carrier frequencies within the same frequency band or within different frequency bands, same PLMN or different PLMNs, same RAT or different RATs. D2D operation may or may not occur on dedicated carrier frequencies. DL and UL carrier frequencies in FDD are also examples of different carrier frequencies. A frequency band herein may be FDD, TDD, HD-FDD, or even unidirectional (e.g., DL-only band such as Band 29, in some examples). Multiple carrier functionality may include carrier aggregation functionality.

A D2D enabled node may generally be a node adapted to perform D2D communication, in particular transmission and/or reception, and/or at least one type of D2D operations. In particular, a D2D enabled node may be a terminal and/or user equipment. The D2D enabled node may be adapted to transmit and/or receive D2D data based on allocation data, in particular on and/or utilizing resources indicate in the allocation data. D2D communication and/or transmission by a D2D enabled node may generally be in UL resources and/or corresponding carrier or frequency and/or modulation. In this context, stopping D2D communication in response and/or based on a release message may be considered to correspond to transmitting based on allocation data, wherein the release message may be considered to be allocation data.

In the context of this description, wireless communication may be communication, in particular transmission and/or reception of data, via electromagnetic waves and/or an air interface, in particular radio waves, e.g. in a wireless communication network and/or utilizing a radio access technology (RAT). The communication may be between nodes of a wireless communication network and/or in a wireless communication network. It may be envisioned that a node in or for communication, and/or in, of or for a wireless communication network is adapted for, and/or for communication utilizing, one or more RATs, in particular LTE/E-UTRA. A communication may generally involve transmitting and/or receiving messages, in particular in the form of packet data.

A message or packet may comprise control and/or configuration data and/or payload data and/or represent and/or comprise a batch of physical layer transmissions. Control and/or configuration data may refer to data pertaining to the process of communication and/or nodes of the communication. It may, e.g., include address data referring to a node of the communication and/or data pertaining to the transmission mode and/or spectral configuration and/or frequency and/or coding and/or timing and/or bandwidth as data pertaining to the process of communication or transmission, e.g. in a header.

Each node involved in communication may comprise radio circuitry and/or control circuitry and/or antenna circuitry, which may be arranged to utilize and/or implement one or more than one radio access technologies.

Radio circuitry of a node may generally be adapted for the transmission and/or reception of radio waves, and in particular may comprise a corresponding transmitter and/or receiver and/or transceiver, which may be connected or connectable to antenna circuitry and/or control circuitry.

Control circuitry of a node may comprise a controller and/or memory arranged to be accessible for the controller for read and/or write access. The controller may be arranged to control the communication and/or the radio circuitry and/or provide additional services. Circuitry of a node, in particular control circuitry, e.g. a controller, may be programmed to provide the functionality described herein. A corresponding program code may be stored in an associated memory and/or storage medium and/or be hardwired and/or provided as firmware and/or software and/or in hardware. A controller may generally comprise a processor and/or microprocessor and/or microcontroller and/or FPGA (Field-Programmable Gate Array) device and/or ASIC (Application Specific Integrated Circuit) device.

More specifically, it may be considered that control circuitry comprises and/or may be connected or connectable to memory, which may be adapted to be accessible for reading and/or writing by the controller and/or control circuitry. Radio access technology may generally comprise, e.g., Bluetooth and/or Wifi and/or WIMAX and/or cdma2000 and/or GERAN and/or UTRAN and/or in particular E-Utran and/or LTE. A communication may in particular comprise a physical layer (PHY) transmission and/or reception, onto which logical channels and/or logical transmission and/or receptions may be imprinted or layered.

A node of a wireless communication network may be implemented as a user equipment and/or base station and/or relay node and/or any device generally adapted for device-to-device communication. A wireless communication network may comprise at least one of a device configured for device-to-device communication and/or a user equipment and/or base station and/or relay node, in particular at least one user equipment, which may be arranged for device-to-device communication with a second node of the wireless communication network, in particular with a second user equipment.

A node of or for a wireless communication network may generally be a wireless device configured for wireless device-to-device communication, in particular using the frequency spectrum of a cellular and/or wireless communications network, and/or frequency and/or time resources of such a network. Device-to-device communication may optionally include broadcast and/or multicast communication to a plurality of devices or nodes.

A user equipment (UE) may generally be a device configured for wireless device-to-device communication and/or a terminal for a wireless and/or cellular network, in particular a mobile terminal, for example a mobile phone, smart phone, tablet, PDA, etc. A user equipment may be a node of or for a wireless communication network as described herein, in particular a D2D enabled node. It may be envisioned that a user equipment is adapted for one or more RATs, in particular LTE/E-UTRA. A user equipment may generally be proximity services (ProSe) enabled. It may be considered that a user equipment comprises radio circuitry and/control circuitry for wireless communication. Radio circuitry may comprise for example a receiver device and/or transmitter device and/or transceiver device. Control circuitry may include a controller, which may comprise a microprocessor and/or microcontroller and/or FPGA (Field-Programmable Gate Array) device and/or ASIC (Application Specific Integrated Circuit) device. It may be considered that control circuitry comprises or may be connected or connectable to memory, which may be adapted to be accessible for reading and/or writing by the controller and/or control circuitry. A node or device of or for a wireless communication network, in particular a node or device for device-to-device communication, may generally be a user equipment. It may be considered that a user equipment is configured to be a user equipment adapted for LTE/E-UTRAN.

A base station may be any kind of base station of a wireless and/or cellular network adapted to serve one or more user equipments. It may be considered that a base station is a node of a wireless communication network. A base station may be adapted to provide and/or define one or more cells of the network and/or to allocate frequency and/or time resources for communication to one or more nodes of a network, in particular UL resources, for example for device-to-device communication, which may be communication between devices different from the base station. Generally, any node adapted to provide such functionality may be considered a base station. It may be considered that a base station comprises radio circuitry and/control circuitry for wireless communication. It may be envisioned that a base station is adapted for one or more RATs, in particular LTE/E-UTRA. Radio circuitry may comprise for example a receiver device and/or transmitter device and/or transceiver device. Control circuitry may include a controller, which may comprise a microprocessor and/or microcontroller and/or FPGA (Field-Programmable Gate Array) device and/or ASIC (Application Specific Integrated Circuit) device. It may be considered that control circuitry comprises or may be connected or connectable to memory, which may be adapted to be accessible for reading and/or writing by the controller and/or control circuitry. A base station may be arranged to be a node of a wireless communication network, in particular configured for and/or to enable and/or to facilitate and/or to participate in device-to-device communication, e.g. as a device directly involved or as an auxiliary and/or coordinating node.

Generally, a base station may be arranged to communicate with a core network and/or to provide services and/or control to one or more user equipments and/or to relay and/or transport communications and/or data between one or more user equipments and a core network and/or another base station and/or be Proximity Service enabled. An eNodeB (eNB) may be envisioned as an example of a base station. A base station may generally be proximity service enabled and/or to provide corresponding services. It may be considered that a base station is configured as or connected or connectable to an Evolved Packet Core (EPC) and/or to provide and/or connect to corresponding functionality. The functionality and/or multiple different functions of a base station may be distributed over one or more different devices and/or physical locations and/or nodes. A base station may be considered to be a node of a wireless communication network. Generally, a base station may be considered to be configured to be a coordinating node and/or to allocate resources in particular for device-to-device communication between two nodes of a wireless communication network, in particular two user equipments.

Device-to-device (D2D) communication or operation may generally refer to communication between nodes of a wireless communication network or corresponding operation of one or more nodes, which may utilize the frequency spectrum and/or frequency and/or time resources of the network, in particular according to LTE/E-UTRAN. The communication may be wireless communication. A device in this context may be a node of the wireless communication network, in particular a user equipment or a base station. Device-to-device communication may in particular be communication involving at least one user equipment, e.g. between two or more user equipments.

Device-to-device communication may be relayed and/or provided via a base station or coordinating node or relay node, in particular without interaction with a core network and/or layers of the network above a base station or coordinating node, or be direct communication between two devices, e.g. user equipments, without involvement of a base station or coordinating node and/or with a base station or coordinating node providing merely auxiliary services, e.g. configuration data or a transmission configuration or related information for a message intended for device-to-device communication between user equipments. In the latter case, it may be considered that data and/or signals flowing between the nodes performing device-to-device communication are not transported via the base station and/or coordinating node. In contrast, during cellular communication, network layers above the eNB/base station/coordination node may generally be involved, in particular core layers which may be connected to the eNB/base station/coordinating node via cable/land line. During device-to-device communication, a message may be provided and/or transmitted and/or received. A message may be considered to be or be represented by a batch of physical layer transmissions and/or may comprise such.

A message may comprise information regarding the transmission configuration, in particular regarding related information, e.g. in a header, and/or a payload. A unidirectional message may be a message for connectionless communication and/or for which no prior communication and/or prior connection between the transmitting node and receiving node is necessary and/or available and/or for which no response or no response protocol or no handshake is expected.

A device configured for and/or capable of device-to-device communication, which may be called D2D enabled device or node, may comprise control circuitry and/or radio circuitry configured to provide device-to-device communication, in particular configured to enable proximity services (ProSe-enabled), e.g., according to LTE/E-UTRA requirements. D2D operation or communication and cellular operation or communication may be considered different operation types or modes, which may generally performed using resources from the same pool of available resources, e.g. allocated resources and/or the same carriers.

A storage medium may be adapted to store data and/or store instructions executable by control circuitry and/or a computing device, the instruction causing the control circuitry and/or computing device to carry out and/or control any one of the methods described herein when executed by the control circuitry and/or computing device. A storage medium may generally be computer-readable, e.g. an optical disc and/or magnetic memory and/or a volatile or non-volatile memory and/or flash memory and/or RAM and/or ROM and/or EPROM and/or EEPROM and/or buffer memory and/or cache memory and/or a database.

Allocated resources may generally be frequency and/or time resources. Allocated resources may comprise frequency-related information, in particular regarding one or more carriers and/or bandwidth and/or subcarriers and/or time-related information, in particular regarding frames and/or slots and/or subframes, and/or regarding resource blocks and/or time/frequency hopping information. Allocated resources may in particular refer to UL resources, e.g. UL resources for a first D2D enabled node to transmit to and/or for a second D2D enabled node.

Transmitting on allocated resources and/or utilizing allocated resources may comprise transmitting data on the resources allocated, e.g. on the frequency and/or subcarrier and/or carrier and/or timeslots or subframes indicated. It may generally be considered that allocated resources may be released and/or de-allocated. A network or a node of a network, e.g. an allocation node, may be adapted to determine and/or transmit corresponding allocation data indicating release or de-allocation of resources to one or more D2D enabled nodes, in particular to a first D2D enabled node. Accordingly, D2D resource allocation may be performed by the network and/or by a node, in particular a node within and/or within a cell of a cellular network covering the D2D enabled nodes participating or intending to participate in the D2D communication.

The term "intra-frequency" may refer to issued related to the same frequency/bandwidth and/or carrier, e.g. between neighboring cells (which may be provided by different BSs) having the same frequencies available. The term "inter-frequency" may refer to issues related to different frequencies/bandwidths and/or carriers, e.g. between different carriers in a multi-carrier arrangement.

A receiving operation may comprise a measurement operation, e.g. a signal quality measurement, which may be performed in a measurement gap, in which a receiver switching to a carrier/frequency to be measured may be performed.

A blank subframe may correspond to a subframe in which a network node provides blank DL transmission and/or no DL transmission.

Receiver switching may generally refer to switch a receiver between D2D operation and cellular operation (or vice versa) and/or to switch between different carriers or frequencies. Receiver sharing may generally described providing a receiver or receiver resource for a different type of operation (D2D or cellular) at least part of the time and/or to use it for different types of operation (D2D or cellular) within a given time interval, e.g. a subframe or frame. Receiver sharing may be arranged or performed by switching the receiver between different operation types or modes, in particular within the given time interval.

Configuring, in particular configuring one or more blank subframes, may comprise or refer to allocating and/or scheduling such subframes to and/or for a D2D enabled node and/or transmitting corresponding allocation data to the D2D enabled node. Configuring a condition may comprise transmitting, e.g. to a D2D enabled node, information indicating the condition and/or configuring the D2D enabled node to perform according to the condition. Configuring a node may generally comprise setting the node into a status conforming to a configuration to be configured, e.g. regarding resources to be used and/or operational mode/'s and/or transmission and/or reception characteristics. Such configuring may comprise the node setting itself accordingly, and/or transmitting configuration data and/or allocation data to the node to be configured, which may receive such.

Some useful abbreviations comprise:
3GPP 3$^{rd}$ Generation Partnership Project
Ack/Nack Acknowledgment/Non-Acknowledgement, also A/N
AP Access point
BER/BLER Bit Error Rate, BLock Error Rate;
BS Base Station
CoMP Coordinated Multiple Point Transmission and Reception
CQI Channel Quality Information
CRS Cell-specific Reference Signal
CSI Channel State Information
D2D Device-to-device
DL Downlink
EPDCCH Enhanced Physical DL Control CHannel
DL Downlink; generally referring to transmission of data to a node/into a direction further away from network core (physically and/or logically); in particular from a base station or eNodeB to a UE; often uses specified spectrum/bandwidth different from UL (e.g. LTE)
eNB evolved NodeB; a form of base station, also called eNodeB
E-UTRA/N Evolved UMTS Terrestrial Radio Access/Network, an example of a RAT
f1, f2, f3, . . . , fn carriers/carrier frequencies; different numbers may indicate that the referenced carriers/frequencies are different
FDD Frequency Division Duplexing
ID Identity
L1 Layer 1
L2 Layer 2
LTE Long Term Evolution, a telecommunications standard
MAC Medium Access Control
MBSFN Multiple Broadcast Single Frequency Network
NW Network
OFDM Orthogonal Frequency Division Multiplexing
O&M Operational and Maintenance
OSS Operational Support Systems
PDCCH Physical DL Control CHannel
PH Power Headroom
PHR Power Headroom Report
PSS Primary Synchronization Signal
RAT Radio Access Technology
RE Resource Element
RB Resource Block
RRH Remote radio head
RRM Radio Resource Management
RRU Remote radio unit
RSRQ Reference signal received quality
RSRP Reference signal received power
RSSI Received signal strength indicator
RX reception/receiver, reception-related
SA Scheduling Assignment
SINR/SNR Signal-to-Noise-and-Interference Ratio; Signal-to-Noise Ratio
SFN Single Frequency Network
SON Self Organizing Network
SSS Secondary Synchronization Signal
TX transmission/transmitter, transmission-related
TDD Time Division Duplexing
UE User Equipment
UL Uplink; generally referring to transmission of data to a node/into a direction closer to a network core (physically and/or logically); in particular from a D2D enabled node or D2D enabled node or UE to a base station or eNodeB; in the context of D2D, it may refer to the spectrum/bandwidth utilized for transmitting in D2D, which may be the same used for UL communication to a eNB in cellular communication; in some D2D variants, transmission by all devices involved in D2D communication may in some variants generally be in UL spectrum/bandwidth/carrier/frequency A method in a device may be a method for operating the device and/or a method performed by the device.

These and other abbreviations may be used according to LTE standard definitions.

The invention claimed is:

1. A method performed by a first device-to-device (D2D) enabled node, the method comprising:
   obtaining a configuration indicative of one or more blank subframes in a first cell and/or on a first carrier frequency, wherein the one or more blank subframes comprise downlink (DL) and/or uplink (UL) subframes and the configuration of the one or more blank subframes is indicative of that the first D2D enabled node is not and will not be scheduled in DL and/or UL during the one or more blank subframes; and
   performing a D2D operation in at least one of the one or more blank subframes; and
   wherein a blank subframe comprised in the one or more blank subframes comprises any of:
      a subframe for receiving a broadcast or multicast service, wherein at least the first D2D enabled node is not receiving this service or the subframe does not contain data to receive for the first D2D enabled node or any D2D enabled node;
      a positioning subframe in which at least the first D2D enabled node is not receiving the positioning service associated with this positioning subframe;
      an almost blank subframe (ABS), wherein at least the first D2D enabled node is not scheduled to receive and/or transmit data, wherein the ABS subframe may be used for inter-cell interference coordination;
      a subframe with low cellular activity or no cellular activity at least for the first D2D enabled node; and
      a subframe with best-effort cellular activity at least for the first D2D enabled node.

2. The method of claim 1, wherein the D2D operation is performed if one or more pre-defined conditions are met.

3. The method of claim 1, wherein the D2D operation is on the first carrier frequency and/or a second carrier frequency.

4. The method of claim 1,
   wherein the first D2D enabled node comprises at least one transmitter and/or receiver; and
   wherein a blank subframe comprised in the one or more blank subframes comprises a subframe during which the first D2D enabled node is configured with one or more measurement gaps during which the first D2D enabled node is not performing any cellular transmitting or receiving operation in the first cell and/or on the first carrier frequency; and during which the first D2D enabled node is configured to use the at least one transmitter and/or receiver for D2D operation on the first carrier frequency and/or a second carrier frequency.

5. The method of claim 1, wherein performing a D2D operation in a blank subframe comprising one or more measurement gaps is performed if the D2D enabled node is not performing any radio measurements in the gap.

6. A device-to-device (D2D) enabled node comprising a processor and a memory, said memory comprising instructions executable by said processor whereby said D2D enabled node is configured to:
   obtain a configuration indicative of one or more blank subframes in a first cell and/or on a first carrier frequency, wherein the one or more blank subframes comprise downlink (DL) and/or uplink (UL) subframes and the configuration of the one or more blank subframes is indicative of that the D2D enabled node is not and will not be scheduled in DL and/or UL during the one or more blank subframes;
   perform a D2D operation in at least one of the one or more blank subframes; and
   wherein a blank subframe comprised in the one or more blank subframes comprises any of:
      a subframe for receiving a broadcast or multicast service, wherein at least the D2D enabled node is not receiving this service or the subframe does not contain data to receive for the D2D enabled node or any D2D enabled node;
      a positioning subframe in which at least the D2D enabled node is not receiving the positioning service associated with this positioning subframe;
      an almost blank subframe (ABS), wherein at least the D2D enabled node is not scheduled to receive and/or transmit data, wherein the ABS subframe may be used for inter-cell interference coordination;
      a subframe with low cellular activity or no cellular activity at least for the D2D enabled node; and
      a subframe with best-effort cellular activity at least for the D2D enabled node.

7. The D2D enabled node of claim 6, wherein the D2D enabled node is configured to perform the D2D operation if one or more pre-defined conditions are met.

8. The D2D enabled node of claim 6, wherein the D2D operation is on the first carrier frequency and/or a second carrier frequency.

9. The D2D enabled node of claim 6,
   wherein the D2D enabled node comprises at least one transmitter and/or receiver; and
   wherein a blank subframe comprised in the one or more blank subframes comprises a subframe during which the D2D enabled node is configured with one or more measurement gaps during which the D2D enabled node is not performing any cellular transmitting or receiving operation in the first cell and/or on the first carrier frequency; and during which the D2D enabled node is configured to use the at least one transmitter and/or receiver for D2D operation on the first carrier frequency and/or a second carrier frequency.

10. The D2D enabled node of claim 6, the D2D enabled node is configured to perform a D2D operation in a blank subframe comprising one or more measurement gaps if the D2D enabled node is not performing any radio measurements in the gap.

11. A method performed by a network node, the method comprising:
   determining one or more blank subframes for use for D2D operation for a first D2D enabled node;
   configuring the one or more blank subframes in a first cell and/or on a first carrier frequency, wherein configuring the one or more blank subframes is indicative that the first D2D enabled node is not and will not be scheduled in downlink (DL) and/or uplink (UL) during the one or more blank subframes, and that the first D2D enabled node may perform and/or schedule a D2D operation during at least one of the configured blank subframes; and
   wherein a blank subframe comprised in the one or more blank subframes comprises any of:
      a subframe for receiving of broadcast or multicast service, wherein at least the first D2D enabled node is not receiving this service or the subframe does not contain data for the first D2D enabled node or any D2D enabled node to receive;
      a positioning subframe in which at least the first D2D enabled node is not receiving the positioning service associated with this positioning subframe;

an almost blank subframe (ABS), wherein at least the first D2D enabled node is not scheduled to receive and/or transmit data;
a subframe with low cellular activity or no cellular activity at least for the first D2D enabled node; and
a subframe with best-effort cellular activity at least for the first D2D enabled node.

12. The method of claim 11, wherein the configuring is such that the D2D operation can be performed by the first D2D enabled node if one or more pre-defined conditions are met.

13. The method of claim 11, wherein the D2D operation is on the first carrier frequency and/or a second carrier frequency.

14. The method of claim 11, wherein a blank subframe comprised in the one or more blank subframes further comprises a subframe during which the first D2D enabled node is configured with one or more measurement gaps during which the first D2D enabled node is not performing any cellular transmitting or receiving operation in the first cell and/or on the first carrier frequency, and during which the first D2D enable node is configured to use at least one transmitter and/or receiver for D2D operation on the first carrier frequency and/or a second carrier frequency.

15. The method of claim 11, wherein configuring the one or more blank subframes is indicative that the D2D operation is performed in a blank subframe comprising one or more measurement gaps if the D2D enabled node is not performing any radio measurements in the gap.

16. A network node for a wireless communication network, the network node comprising a processor and a memory, said memory comprising instructions executable by said processor whereby said network node is configured to:
determine one or more blank subframes for use for device-to-device (D2D) operation for a first D2D enabled node; and
configure the one or more blank subframes in a first cell and/or on a first carrier frequency, wherein configuring the one or more blank subframes is indicative of that the first D2D enabled node is not and will not be scheduled in downlink (DL) and/or uplink (UL) during the one or more blank subframes, and that the first D2D enabled node may perform and/or schedule a D2D operation during at least one of the configured blank subframes; and
wherein a blank subframe comprised in the one or more blank subframes comprises any of:
a subframe for receiving of broadcast or multicast service, wherein at least the first D2D enabled node is not receiving this service or the subframe does not contain data for the first D2D enabled node or any D2D enabled node to receive;
a positioning subframe in which at least the first D2D enabled node is not receiving the positioning service associated with this positioning subframe;
an almost blank subframe (ABS), wherein at least the first D2D enabled node is not scheduled to receive and/or transmit data;
a subframe with low cellular activity or no cellular activity at least for the first D2D enabled node; and
a subframe with best-effort cellular activity at least for the first D2D enabled node.

17. The network node of claim 16, wherein the network node is configured to configure the one or more blank subframes such that the D2D operation can be performed by the first D2D enabled node if one or more pre-defined conditions are met.

18. The network node of claim 16, wherein the D2D operation is on the first carrier frequency and/or a second carrier frequency.

19. The network node of claim 16, wherein a blank subframe comprised in the one or more blank subframes further comprises a subframe during which the first D2D enabled node is configured with one or more measurement gaps during which the first D2D enabled node is not performing any cellular transmitting or receiving operation in the first cell and/or on the first carrier frequency, and the first D2D enabled node is configured to use at least one transmitter and/or receiver for D2D operation on the first carrier frequency and/or a second carrier frequency.

20. The network node of claim 16, wherein configuring the one or more blank subframes is indicative of that D2D operation is performed in a blank subframe comprising one or more measurement gaps if the D2D enabled node is not performing any radio measurements in the gap.

21. A computer program product stored on a non-transitory, computer readable medium and comprising program instructions executable by control circuitry of a first device-to-device (D2D) enabled node, which when executed by the control circuitry, cause the control circuitry to:
obtain a configuration indicative of one or more blank subframes in a first cell and/or on a first carrier frequency, wherein the one or more blank subframes comprise downlink (DL) and/or uplink (UL) subframes and the configuration of the one or more blank subframes is indicative of that the first D2D enabled node is not and will not be scheduled in DL and/or UL during the one or more blank subframes; and
perform a D2D operation in at least one of the one or more blank subframes; and
wherein a blank subframe comprised in the one or more blank subframes comprises any of:
a subframe for receiving of broadcast or multicast service, wherein at least the first D2D enabled node is not receiving this service or the subframe does not contain data for the first D2D enabled node or any D2D enabled node to receive;
a positioning subframe in which at least the first D2D enabled node is not receiving the positioning service associated with this positioning subframe;
an almost blank subframe (ABS), wherein at least the first D2D enabled node is not scheduled to receive and/or transmit data;
a subframe with low cellular activity or no cellular activity at least for the first D2D enabled node; and
a subframe with best-effort cellular activity at least for the first D2D enabled node.

22. A computer program product stored on a non-transitory, computer readable medium and comprising program instructions executable by control circuitry of a first device-to-device (D2D) enabled node, which when executed by the control circuitry, cause the control circuitry to:
determine one or more blank subframes for use for D2D operation for a first D2D enabled node;
configure the one or more blank subframes in a first cell and/or on a first carrier frequency, wherein configuring the one or more blank subframes is indicative that the first D2D enabled node is not and will not be scheduled in downlink (DL) and/or uplink (UL) during the one or more blank subframes, and that the first D2D enabled node may perform and/or schedule a D2D operation during at least one of the configured blank subframes; and wherein a blank subframe comprised in the one or more blank subframes comprises any of:
- a subframe for receiving of broadcast or multicast service, wherein at least the first D2D enabled node is not receiving this service or the subframe does not contain data for the first D2D enabled node or any D2D enabled node to receive;
- a positioning subframe in which at least the first D2D enabled node is not receiving the positioning service associated with this positioning subframe;
- an almost blank subframe (ABS), wherein at least the first D2D enabled node is not scheduled to receive and/or transmit data;
- a subframe with low cellular activity or no cellular activity at least for the first D2D enabled node; and
- a subframe with best-effort cellular activity at least for the first D2D enabled node.

23. The method of claim 11, wherein the network node is configured as a coordinating node for D2D communication between D2D enabled nodes, including the first D2D enabled node.

24. The method of claim 1, wherein the configuration is indicative that the first D2D enabled node may perform a D2D operation during at least one of the configured blank subframes.

25. The method of claim 1, wherein the obtaining comprises obtaining a message from a network node configuring the first D2D enabled node, the message comprising the configuration and a condition under which the one or more blank subframes can be used for the D2D operation.

26. The method of claim 25, wherein performing the D2D operation comprises performing the D2D operation only if the condition is met.

27. The method of claim 25, wherein the first D2D enabled node determines a parameter describing the interference conditions of the usage of the one or more blank subframes for the D2D operation in response to the condition.

28. The method of claim 25, wherein the one or more blank subframe comprise a measurement gap, and the method comprises determining whether the first D2D enabled node is performing any radio measurements in the measurement gap based on the condition, and performing the D2D operation only if the first D2D enabled node is not performing any radio measurements in the measurement gap.

29. The method of claim 11, when the determining comprises determining one or more D2D-enabled-node-specific blank subframes for use for D2D operation for the particular first D2D enabled node.

30. The method of claim 11, wherein the configuring comprises configuring a condition in which the enabled node must perform and/or schedule the D2D operation only when the condition is met.

31. A method performed by a first device-to-device (D2D) enabled node, the method comprising:
- obtaining a message comprising a configuration indicative of one or more blank subframes in a first cell and/or on a first carrier frequency, wherein the one or more blank subframes comprise downlink (DL) and/or uplink (UL) subframes and the configuration of the one or more blank subframes is indicative of that the first D2D enabled node is not and will not be scheduled in DL and/or UL during the one or more blank subframes, wherein the message further comprises a condition under which the one or more blank subframes can be used for a D2D operation; and
- performing a D2D operation in at least one of the one or more blank subframes,
- wherein the first D2D enabled node determines a parameter describing interference conditions of the usage of the one or more blank subframes for the D2D operation in response to the condition.

32. A method performed by a first device-to-device (D2D) enabled node, the method comprising:
- obtaining a configuration indicative of one or more blank subframes in a first cell and/or on a first carrier frequency, wherein the one or more blank subframes comprise downlink (DL) and/or uplink (UL) subframes and the configuration of the one or more blank subframes is indicative of that the first D2D enabled node is not and will not be scheduled in DL and/or UL during the one or more blank subframes, wherein the one or more blank subframe comprise a measurement gap; and
- performing a D2D operation in at least one of the one or more blank subframes only if the first D2D enabled node is not performing any radio measurements in the measurement gap.

33. The method of claim 32,
- wherein the obtaining comprises obtaining a message from a network node configuring the first D2D enabled node, the message comprising the configuration and a condition under which the one or more blank subframes can be used for the D2D operation; and
- wherein the method comprises determining whether the first D2D enabled node is performing any radio measurements in the measurement gap based on the condition.

* * * * *

UNITED STATES PATENT AND TRADEMARK OFFICE
CERTIFICATE OF CORRECTION

PATENT NO. : 10,206,210 B2
APPLICATION NO. : 14/778544
DATED : February 12, 2019
INVENTOR(S) : Siomina et al.

Page 1 of 1

It is certified that error appears in the above-identified patent and that said Letters Patent is hereby corrected as shown below:

In the Specification

In Column 4, Line 13, delete "my" and insert -- may --, therefor.

In Column 10, Line 11, delete "non-bank" and insert -- non-blank --, therefor.

In Column 10, Line 20, delete "respect" and insert -- respective --, therefor.

In Column 11, Line 1, delete "bank" and insert -- blank --, therefor.

In Column 25, Line 34, delete "may generally" and insert -- may generally be --, therefor.

In Column 25, Line 62, delete "Rate;" and insert -- Rate --, therefor.

Signed and Sealed this
Eighth Day of December, 2020

Andrei Iancu
*Director of the United States Patent and Trademark Office*